MEMORY ELEMENT USING MAGNETIC THIN FILM WIRE

Filed Dec. 5, 1966 2 Sheets-Sheet 1

INVENTORS
YOSHIHIRO TOHMA
MINORU TAKASHIMA
SHIGETOSHI WATANABE
BY
H. Edward Nestern

INVENTORS
YOSHIHIRO TOHMA, MINORU TAKASHIMA, SHIGETOSHI WATANABE

H. Edward Mastern

United States Patent Office 3,500,353

Patented Mar. 10, 1970

3,500,353

MEMORY ELEMENT USING MAGNETIC THIN FILM WIRE

Yoshihiro Tohma, Minoru Takashima, and Shigetoshi Watanabe, Tokyo-to, Japan, assignors to Toko Kabushiki Kaisha, Tokyo-to, Japan, a joint-stock company of Japan Filed Dec. 5, 1966, Ser. No. 599,101
Claims priority, application Japan, Dec. 11, 1965, 40/76,153
Int. Cl. G11c *11/14*
U.S. Cl. 340—174 2 Claims

ABSTRACT OF THE DISCLOSURE

A memory element of the type provided with cylindrical magnetic thin film wire used as information lines for writing-in and reading-out information and word lines crossing the information lines has a cancellation line for mutual nullification of word noise voltages thereby improving the signal-noise ratio. The information line and the cancellation lines are combined on the same base plate. The cancellation line consists of a core wire that is coated with a film of a magnetic thin film which does not have magnetic anisotropy or a ferromagnetic material caused to have magnetic anisotropy in the wire axial direction.

This invention relates to the memory elements of the type provided with cylindrical magnetic thin film wire used as information lines for writing in and reading out information and word lines crossing the information lines. More specifically, the invention concerns a new memory element of this type which is provided with means for cancelling word noise voltage induced in the information lines from the word lines through stray capacitances at the crosspoints of the word lines and information lines.

Memory elements of the type referred to above have heretofore been accompanied by certain difficulties, as described hereinafter, whereby it has been difficult or impossible to cancel word noise voltage induced in the information lines.

It is an object of the present invention to provide a memory element of the type referred to above which is provided with a cancellation line with respect to each information line for cancelling word noise voltage induced in the information line.

Another object of the invention is to provide a cancellation line of simple construction which can be produced by coating a core wire with a magnetic film of desired thickness by mere electroplating.

According to the present invention, briefly stated, there is provided, in a memory element of the above stated character, means for cancelling word noise voltage comprising, with respect to each information line, a cancellation line consisting of a cylindrical magnetic thin film wire having a magnetization easy axis in the wire axial direction or a cylindrical magnetic thin film wire which does not have a magnetization easy axis, said cancellation line being combined on a common base plate with the corresponding information line which is caused to have a magnetization easy axis in the wire circumferential direction.

The nature, principle, and details of the invention will be more clearly apparent from the following detailed description when read in conjunction with the accompanying drawings, in which like parts are designated by like reference numerals and characters.

As conducive to a full understanding of the nature and utility of the invention, the following general consideration of two-crosspoint, one-bit systems in which cylindrical magnetic thin film wire is used and the principal problems associated therewith is presented.

Figure 1:
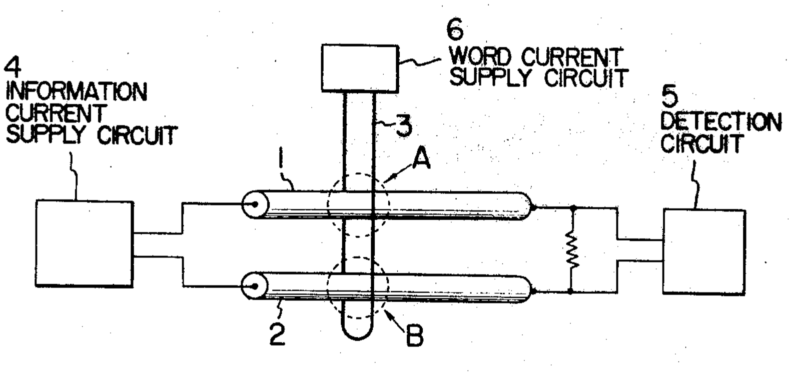
FIG. 1 is a schematic diagram, partly enlarged, illustrating one example of the composition and arrangement of parts of a two-crosspoint, one-bit system.

In one example of such a system as shown in FIG. 1, one bit of information is stored by means of two crosspoints A and B of a pair of information lines 1 and 2 with a word line 3. The ends on one side (the left-hand side as viewed in FIG. 1) of the information lines 1 and 2 are connected to an information current supply circuit 4, and the other ends thereof on the other side (the right-hand side as viewed in FIG. 1) are connected to a read-out voltage detection circuit 5. The terminals of the word line 3 are connected to a word current supply circuit 6.

A memory means of the above described composition and arrangement is known to be effective in nullifying or cancelling word noise voltages induced in the information lines by potential fluctuations in the word line 3, functioning through the stray capacitance $C_{WD}$ between the word line 3 and the information lines 1 and 2.

Figure 2:
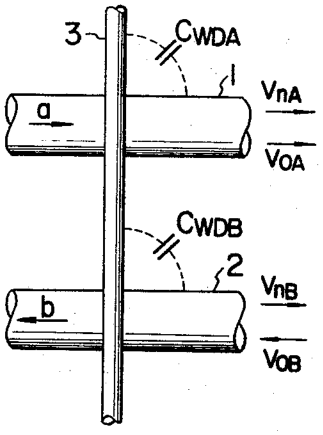
FIG. 2 is an enlarged, fragmentary view illustrating the case wherein information lines of magnetic material are used in pairs.

More explicitly, referring to FIG. 2, a potential fluctuation V in the word line 3 induces voltages $V_{nA}$ and $V_{nB}$ from the word line 3 with respect to information lines 1 and 2 through their respective stray capacitances $C_{WDA}$ and $C_{WDB}$. These induced voltages $V_{nA}$ and $V_{nB}$ are of the same phase with respect to ground potential, and, moreover, the magnitudes of the stray capacitances $C_{WDA}$ and $C_{WDB}$ are equal because of the construction and arrangement of the parts. Therefore, the induced voltages $V_{nA}$ and $V_{nB}$ are of the same phase and, at the same time, become word noise voltages of the same amplitude.

On the one hand, if information currents are to be supplied in the directions of the arrows *a* and *b* or in directions counter thereto to accomplish writing in, the read-out voltage $V_{oA}$ produced at the memory storage point of the information line 1 and the read-out voltage $V_{oB}$ produced at the memory storage point of the information line 2 become voltages of opposite phase and equal amplitude.

Therefore, by using an element for removing signals of the same phase on the input side of the read-out voltage detection circuit 5 (shown in FIG. 1), the two word noise voltages $V_{nA}$ and $V_{nB}$ are caused to cancel each other and become zero, and the readout voltages $V_{oA}$ and $V_{oB}$, on the other hand, become additive, whereby it is possible to improve the signal-to-noise ratio.

For the above mentioned element for removal of signals of the same phase, a known device such as a differential amplifier, a balancing transformer, or a common-mode choke can be used.

Figure 3:
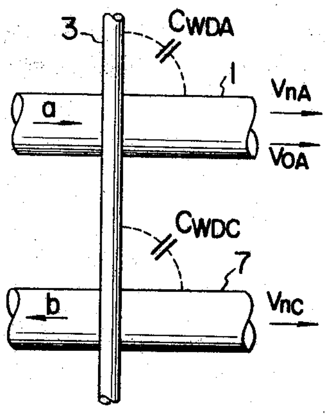
FIG. 3 is a similar enlarged, fragmentary view illustrating the case wherein an information line of a magnetic material is combined with a nonmagnetic line.

As is known, a read-out voltage of a memory element in which cylindrical magnetic thin film wire is used is obtained by the variation in the magnetic flux of the magnetic thin film on an information line. When an information line 1 having a magnetic thin film is combined with a non-magnetic line 7 as indicated in FIG. 3, only the read-out voltage $V_{oA}$ of the information line 1 is detected in the read-out detection circuit, and the word noise voltages $V_{nA}$ and $V_{nB}$ assume the same phase similarly as in the case illustrated in FIG. 2. Therefore, it is possible to cause mutual cancellation of the word noise voltages by using an element for removing signals of the same phase.

However, when a memory element of the above described character is actually used in a memory device of large capacity, since the information lines are connected in the vertical and horizontal directions and become long, there arises the problem of their signal propagation delay times assuming magnitudes which cannot be neglected.

That is, in the case where information lines 1 and 2 are used as a pair as shown in FIG. 2, the propagation delay times from the crosspoints of these information lines with the word line 3 to the read-out detection circuit are equal, and, therefore, cancellation of the word noise voltages can be attained. However, in the case where an information line 1 and a non-magnetic line 7 are used as shown in FIG. 3, it is difficult to match the propagation characteristics of the two lines. If a difference occurs between the signal propagation delay times of the two lines, a phase difference will be produced between the word noise voltage of the two lines in the input of the read-out detection circuit even when the word noise voltages at the crosspoint of the word line 3 and the information line 1 and the crosspoint of the word line 3 and the non-magnetic line 7 are of the same amplitude and same phase. As a result, cancellation of the word noise voltages becomes impossible.

The present invention contemplates the provision of a cancellation line for mutual nullification of word noise voltages in cases such as that described above.

The principal characteristics required of a cancellation line for achieving this object of the invention are as follows:

(1) The stray capacitance of the word line and the cancellation line is equal to the stray capacitances, constituting a pair, of the word line and the information lines;

(2) The signal propagation delay times of the information lines, constituting a pair, and the cancellation line are equal; and (3) The magnitudes of the signal attenuations of the information lines, constituting a pair, and the cancellation line are equal.

These requirements will now be considered with respect to the case where the non-magnetic line 7 shown in FIG. 3 is used as a cancellation line. The stray capacitances of the information line 1 and the non-magnetic line 7 can be made equal by using the same wire diameter for both lines. In this case, however, in comparison with the information line 1 coated with a magnetic material, the non-magnetic line 7 has a lower inductance along its line length and, therefore, a shorter signal propagation delay time. Even if the wire diameter of the non-magnetic line 7 is made smaller in an attempt to effect an adjustment, there will arise the problem of the stray capacitances between the word line 3 and the non-magnetic line 7 and between the word line 3 and the information line 1 becoming unequal.

In accordance with the present invention, therefore, a magnetic material which does not have magnetic anisotropy or a magnetic material having magnetic anisotropy in the wire axial direction is applied as a coating of a desired film thickness on a core wire of the same material and wire diameter as the information line, and the core wire thus coated is used as a cancellation line thereby to obtain the above-set-forth characteristics 1, 2, and 3.

Figure 4:
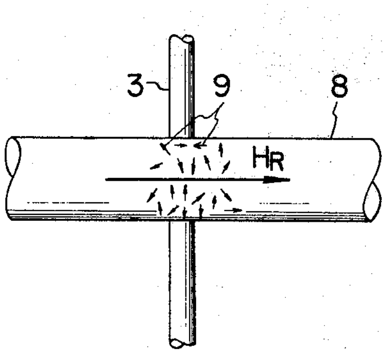
FIG. 4 is an enlarged, fragmentary view showing one example of preferred embodiment of the invention.
Figure 6:
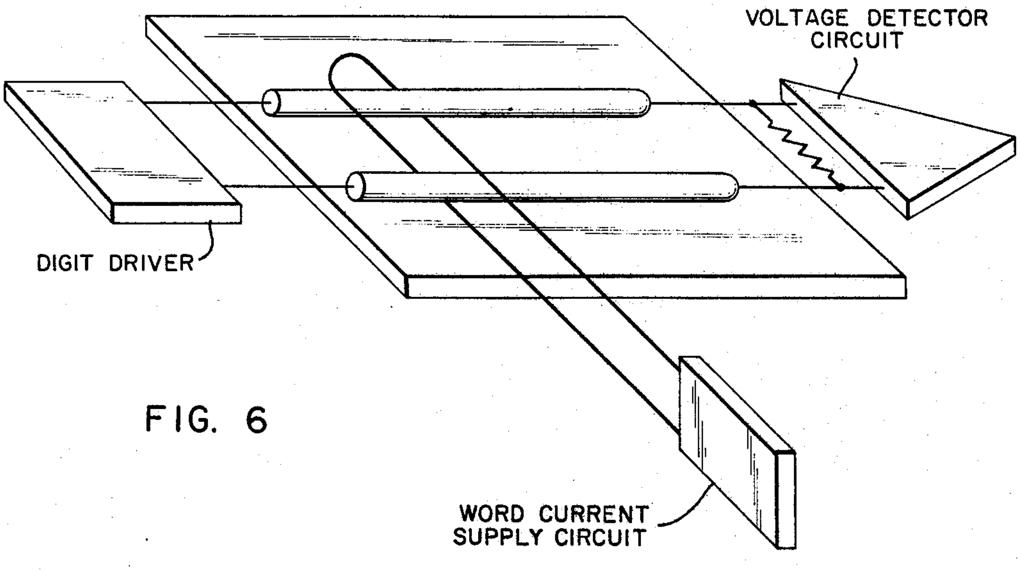
FIG. 6 is a perspective view of the embodiment shown in FIG. 1.

In one embodiment of the invention as illustrated in FIG. 4, there is provided a cancellation line 8 crossed by a word line 3 and an information line (not shown) also crossed by the word line 3, the cancellation line 8 being of the same material and diameter as the information line and being coated with a magnetic thin film which does not have magnetic anisotropy. Since the magnetic vectors 9 within the magnetic coating of this cancellation line 8 assume random directions as indicated in FIG. 4, when a read-out magnetic field $H_R$ in the axial direction of this line 8 is applied, the sum total of the magnetic flux variations produced by the rotations of the various magnetic vectors 9 becomes zero, whereby a read-out voltage is not produced.

Then, by suitably selecting the film thickness of the magnetic coating, the inductance along the wire length of the cancellation line 8 can be caused to be equal to that of the information line. More specifically, the film thickness $\theta_C$ of the cancellation line 8 in this case can be expressed by the following equation in accordance with the theory of electromagnetism.

$$\theta_C = \frac{\mu A}{\mu C} \theta_A \qquad (1)$$

where:

$\mu_C$ is the initial permeability of the magnetic film of the cancellation line;

$\mu_A$ is the small-signal permeability of the magnetic film of the information line; and $\theta_A$ is the magnetic film thickness of the information line.

Since $\mu_A < \mu_C$, in general, a coated cancellation line of the desired characteristic can be produced by a relatively simple electroplating process.

Figure 5:
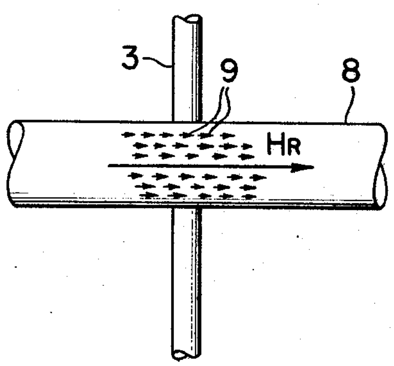
FIG. 5 is an enlarged, fragmentary view showing another example of preferred embodiment of the invention.

In another embodiment of the invention as illustrated in FIG. 5, the cancellation line 8 is coated with a ferromagnetic thin film which has been caused to have magnetic anisotropy in the wire axial direction (i.e., the same direction as the read-out magnetic field). Since there is no magnetic flux variation due to the read-out magnetic field $H_R$ in this case, the cancellation line can be used as a word noise voltage cancellation line which does not produce a read-out voltage, and the inductance along the wire length of the cancellation line 8 can be caused to be equal to that of the information line (not shown) by appropriately selecting the film thickness of its coating of magnetic material similarly as in the case illustrated in FIG. 4. This film thickness $\theta_{ac}$ can be expressed by the following equation.

$$\theta_{ac} = \frac{\mu_A}{\mu_{ac}} \theta_A \qquad (2)$$

where:

$\mu_{ac}$ is the small-signal permeability of the cancellation line having a magnetization easy axis in the wire axial direction;

$\mu_A$ is the small-signal permeability of the magnetic film of the information line; and $\theta_A$ is the magnetic film thickness of the information line.

According to the experimental results, the ratio of $\mu_A/\mu_{ac}$ is of the order of 0.3. Therefore, a cancellation line of this character can also be readily obtained by electroplating.

As described above, the present invention provides, a memory element of the type in which magnetic thin film wire is used, and in which there are combined, on the same base plate, an information line and a cancellation line consisting of a core wire of the same material and same wire diameter as the information line, which core wire is coated with a film of a magnetic thin film which does not have magnetic anisotropy or a ferromagnetic material caused to have magnetic anisotropy in the wire axial direction.

By using this coated wire as a cancellation line, it is possible to cancel word noise voltages induced in the information line by potential fluctuations in the word line, whereby it is possible to improve remarkably the performance of a large-capacity memory device. Moreover, another advantageous feature of this cancellation wire is that it can be easily produced by a simple electroplating process to coat the core wire with a film of any desired thickness.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What we claim is:

1. In a memory element of the type provided with cylindrical magnetic thin film wire used as information lines for writing in and reading out information and word lines crossing the information lines, means for cancelling word noise voltage induced in the information lines from the word lines through stray capacitances at the crosspoints of the word lines and information lines, said means comprising, with respect to each information line, a cancellation line consisting of a cylindrical magnetic thin film wire which has a magnetization easy axis in the wire axial direction and combined on a common base plate with said each information line which is caused to have a magnetization easy axis in the wire circumferential direction.

2. In a memory element of the type provided with cylindrical magnetic thin film wire used as information lines for writing in and reading out information and word lines crossing the information lines, means for cancelling word noise voltage induced in the information lines from the word lines through stray capacitances at the crosspoints of the word lines and information lines, said means comprising, with respect to each information line, a cancellation line consisting of a cylindrical magnetic thin film wire which does not have a magnetization easy axis and combined on a common base plate with said each information line which is caused to have a magnetization easy axis in the wire circumferential direction.

References Cited

UNITED STATES PATENTS 3,397,394 8/1968 Maeda -------------- 340—174

OTHER REFERENCES

Publication I—IBM Technical Disclosure Bulletin, vol. 8, No. 10, March 1966, pp. 1421–1422.

JAMES W. MOFFITT, Primary Examiner